(12) United States Patent
Wang et al.

(10) Patent No.: US 7,672,554 B1
(45) Date of Patent: Mar. 2, 2010

(54) SPACE EXPANDERS IN OPTICAL DEVICES

(75) Inventors: Daoyi Wang, Sunnyvale, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 1475 days.

(21) Appl. No.: 10/845,802

(22) Filed: May 15, 2004

(51) Int. Cl.
*G02B 6/26* (2006.01)
*G02B 6/42* (2006.01)
*G02B 6/28* (2006.01)
*G02B 6/32* (2006.01)
*G02B 6/34* (2006.01)

(52) U.S. Cl. .............................. 385/47; 385/24; 385/33; 385/36

(58) Field of Classification Search .................... 385/18, 385/31, 33–36, 47
See application file for complete search history.

(56) References Cited

U.S. PATENT DOCUMENTS

| | | | |
|---|---|---|---|
| 4,244,045 A | 1/1981 | Nosu | |
| 5,786,915 A | 7/1998 | Scobey | |
| 6,539,145 B1 * | 3/2003 | Auracher et al. | 385/24 |
| 2002/0051603 A1 * | 5/2002 | Hajjar et al. | 385/24 |
| 2003/0133197 A1 * | 7/2003 | Chang et al. | 359/634 |
| 2003/0202741 A1 * | 10/2003 | Abushagur | 385/24 |

* cited by examiner

*Primary Examiner*—Uyen-Chau N Le
*Assistant Examiner*—Rhonda S Peace
(74) *Attorney, Agent, or Firm*—Wuxi Sino-US IP Agency, Ltd.; Joe Zheng (57) ABSTRACT

New designs of optical devices, particularly for multiplexing or demultiplexing as well as adding or dropping are disclosed. According to one aspect of the designs, one or more beam redirecting parts (e.g., prisms or mirrors) are used in an optical device to redirect a beam for at least two purposes: to increase a distance between two optical parts that are not positioned along an optical path, by using one or two of such beam redirecting parts, and to minimize an angle of incidence (AOI) to an optical filter or to adjust the AOI to an optimum value. As a result, devices employing the techniques provide small AOL and flexibility in adjustment and are amenable to small footprint, broad operating wavelength range, enhanced impact performance, lower cost, and easier manufacturing process.

17 Claims, 6 Drawing Sheets

SPACE EXPANDERS IN OPTICAL DEVICES

BACKGROUND OF THE INVENTION

1. Field of the Invention

The invention is generally related to the area of optical communications. In particular, the invention is related to optical space expanders used in optical devices such as multiplexing/demultiplexing or add/drop devices with optical filters in free space and the method for making the same.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Figure 1:
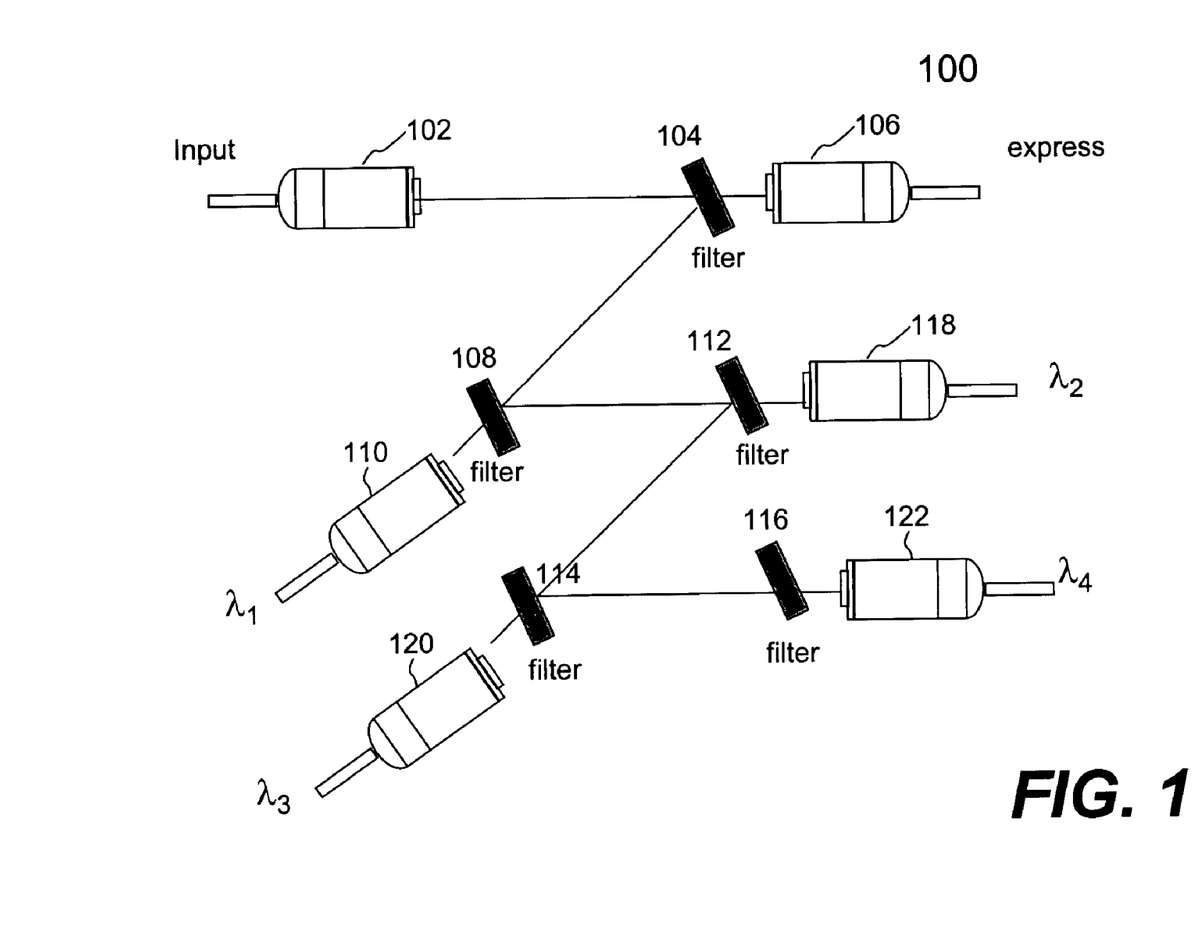
FIG. 1 shows a conventional CWDM device 100 that can be used for multiplexing or demultiplexing.

Optical multiplexing/demultiplexing devices are those elements often used in optical systems and networks to combine or multiplex a number of optical signals into a multiplexed signal, or separate or demultiplex a multiplexed signal into separate signals. FIG. 1 shows a conventional CWDM device 100 that can be used for multiplexing or demultiplexing purpose. For demultiplexing operation, a multiplexed signal or a light beam is coupled to an input collimator 102. The light beam includes, for example, a number of separate signals, each for a channel or at a particular wavelength, for example, wavelengths $\lambda_1, \lambda_2, \ldots \lambda_N$. The light beam is coupled by a collimator 102 to a first filter 104 that is configured to pass all channels or wavelengths except for four selected channels or wavelengths $\lambda_1, \lambda_2, \lambda_3$, and $\lambda_4$. As a result, signals for other than the selected channels or at wavelengths other than the wavelengths $\lambda_1, \lambda_2, \lambda_3$, and $\lambda_4$ transmit through the filter 104 and outputs via a collimator 106.

On the other hand, signals for the selected channels or at the wavelengths $\lambda_1, \lambda_2, \lambda_3$, and $\lambda_4$ are reflected to a filter 106. For simplicity, a channel and a wavelength are interchangeably used hereinafter unless explicitly stated. It is assumed that the filter 106 is configured to pass a wavelength $\lambda_1$ such that the signal at wavelength $\lambda_1$ transmits through the filter 108 and outputs via a collimator 110 and others are reflected to a next filter 112. In the similar fashion, each of the filters 112, 114 and 116 are configured respectively to pass a wavelength $\lambda_2$, $\lambda_3$, or $\lambda_4$ and eventually signals at the wavelengths $\lambda_2, \lambda_3$, and $\lambda_4$ are respectively output from collimators 118, 120 and 122.

In general, the individual components, such as collimators 102, 106, 110, 118, 120, and 122 as well as the filters 104, 108, 112, 114 and 116, are assembled to a common substrate. The resultant device shall be small enough. When two components are positioned in close proximity, a certain amount of cross talk between the optical paths leading to the components may happen. To minimize the cross talk between two or more optical paths, a light beam is usually impinged upon a filter at an angle that is referred to herein as angle of incidence (AOI). In theory, a large AOI may minimize the cross talk. However, a large AOI would cause the filter to perform undesirably, namely the frequency response of an optical filter depends somehow on the AOI, resulting in unwanted residues (i.e., errors) in filtered or reflected signals. When a number of devices, such as device 100, are cascaded, the errors are accumulated or amplified.

In assembling the individual components to a common substrate, various types of mounting means may be used. One of them is to use wedges to position each of the components to the common substrate. The mounting space sets a limit on a minimum lateral distance adjacent to a component or between two components, thus a minimum achievable beam incidence angle to a filter.

There is another issue related to a loss profile control in the prior art multiplexing/demultiplexing devices. Typically, an optical path length from an input collimator to a receiving channel collimator is very limited, as a result, the collimator characteristics dominates the loss of each wavelength channel. As the collimators are close to filters, no enough distance adjustment space is available. To obtain a desired loss profile, for example, high channel uniformity, one often tries a combination of different types of collimators. However, the use of mixed collimator types may increase the manufacturing and assembling complexity.

Further, another issue associated with the prior art devices is the adjustment of the filter central wavelength. If a filter central wavelength is out of a desired range, the filter may be rotated or adjusted to change the central wavelength. However, after the filter is rotated or repositioned, the output beam from the filter departs from the original direction, resulting in difficulty in manufacturing or assembling. Worse is, as the beam propagates, that the output beam, thus the aligned output collimator is out of the desired position, which can cause significant packaging problems.

Accordingly, there is a great need for new designs that provide small AOL and flexibility in adjustment in devices that are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for multiplexing separate channels or signals into a multiplexed signal and demultiplexing a multiplexed signal to separate channels or signals at wavelengths, as well as for adding or dropping a selected channel or signal at a particular wavelength. Such devices are widely used in optical applications, systems and transmissions. For simplicity, a group of selected wavelengths or selected channels by an optical filter will be deemed or described as a selected wavelength or channel hereinafter as it is well known in the art that such optical filter is readily available or characteristics thereof can be readily achieved (e.g., optical thin films).

According to one aspect of the present invention, one or more beam redirecting parts are used in an optical device to redirect a beam for at least two purposes. One of the purposes is to increase a distance between two optical parts that are not positioned along an optical path, by using one or two of such beam redirecting parts, a light beam is properly redirected from one of the optical parts to another. Accordingly, the beam redirecting parts are also referred to as space expanders.

Another one of the purposes is to minimize an angle of incidence (AOI) to an optical filter or to adjust the AOI to an optimum value. Because of the array arrangement of optical filters versus corresponding collimators in prior art devices, the angles of incidence are hard to control and adjust and sometimes remain fairly large to cause undesired spectral responses from the optical filter, the use of the beam redirecting parts in the present invention can be adjusted to minimize the angles of incidence (AOI) to the optical filters without even affecting positions of either the optical filters or the collimators.

Depending on implementation, a beam redirecting part may be a prism or a mirror, either one is used to guide a light beam to a desired target. When a prism is used, the light beam can be redirected by reflection or transmission.

One of the objects, features, advantages of the present invention is to provide new designs that provide small AOL and flexibility in adjustment in devices that are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of optical devices. In particular, these devices are used for multiplexing separate channels or signals into a multiplexed signal and demultiplexing a multiplexed signal to separate channels or signals at wavelengths, as well as for adding or dropping a selected channel or signal at a particular wavelength. According to one aspect of the present invention, one or more beam redirecting parts (e.g., prisms or mirrors) are used in an optical device to redirect a beam for at least two purposes. One of the purposes is to increase a distance between two optical parts that are not positioned along an optical path, by using one or two of such beam redirecting parts, a light beam is properly redirected from one of the optical parts to another.

Accordingly, the beam redirecting parts are also referred to as space expanders. Another one of the purposes is to minimize an angle of incidence (AOI) to an optical filter or to adjust the AOI to an optimum value. Because of the array arrangement of optical filters versus corresponding collimators in prior art devices, the angles of incidence are hard to control and adjust and sometimes remain fairly large to cause undesired spectral responses from the optical filter, the use of the beam redirecting parts in the present invention can be adjusted to minimize the angles of incidence (AOI) to the optical filters without even affecting positions of either the optical filters or the collimators.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figures 2A, 2B, 2C:
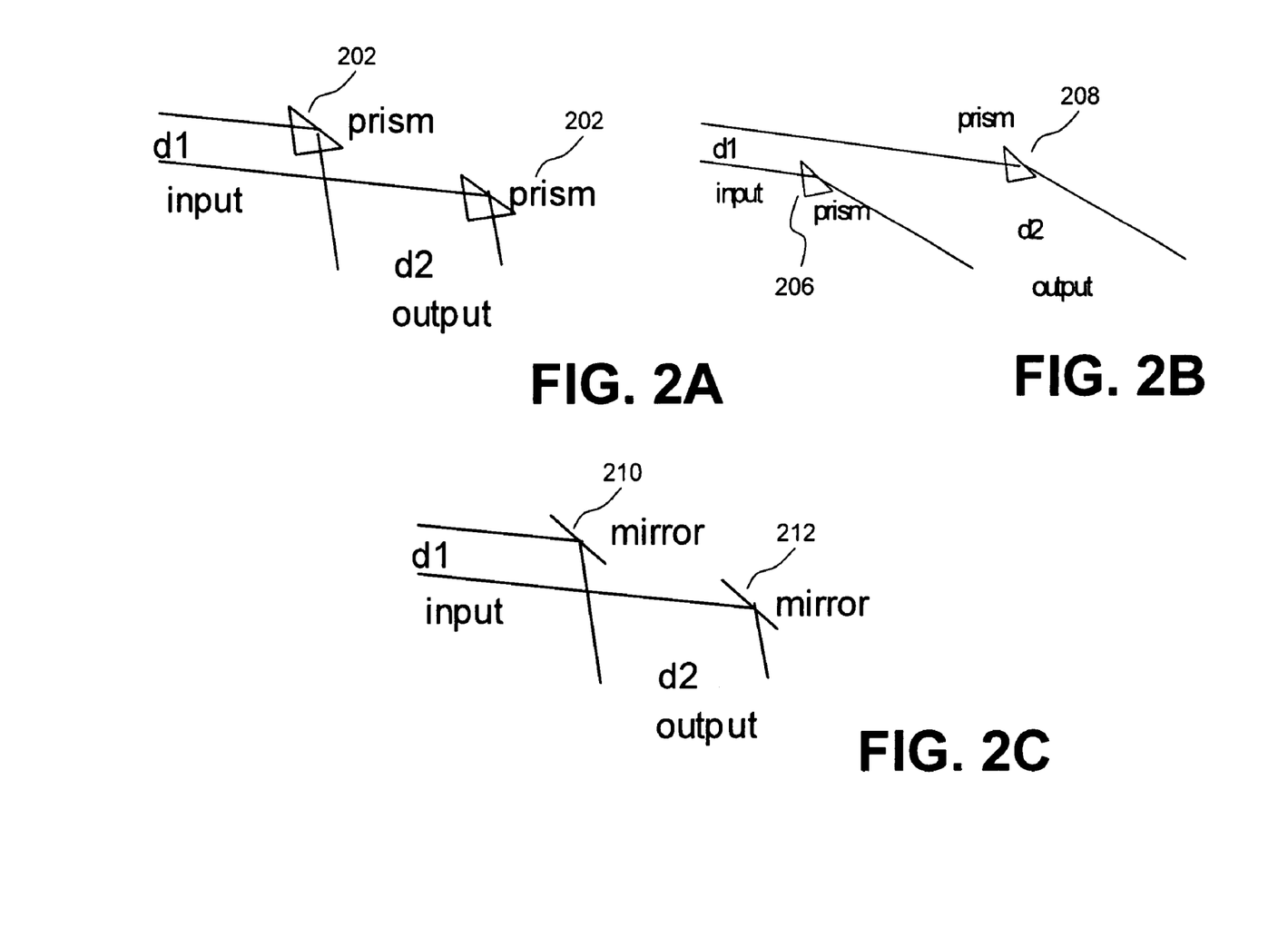
FIG. 2A shows, according to one embodiment of the present invention, the use of reflection prism space expanders.
FIG. 2B shows, according to one embodiment of the present invention, the use of transmission prism space expanders.
FIG. 2C shows, according to one embodiment of the present invention, the use of two mirrors and as space expanders.

Referring now to the drawings, in which like numerals refer to like parts throughout the several views. FIG. 2A shows, according to one embodiment of the present invention, the use of reflection prism space expanders 202 and 204. Two light beams, for example, from two collimators respectively, impinge upon the space expanders 202 and 204. Because of the optical characteristics of the prism, the space expanders 202 and 204 reflect, respectively, the light beams to a new direction. It can be observed that, at the input side, the distance, denoted by d1, between the two input light beams is relatively smaller than the distance, denoted by d2, between the two output light beams. Essentially, the space between two light beams is expanded by the two space expanders 202 and 204 placed in the respective optical paths of the two light beams. It can be appreciated by those skilled in that art that d2 can be readily adjusted by adjusting either one or both of the space expanders 202 and 204.

FIG. 2B shows, according to one embodiment of the present invention, the use of transmission prism space expanders 206 and 208. Similarly, when two light beams, for example, from two collimators respectively, impinge upon the space expanders 206 and 208 that, respectively, deviate, the light beams to a new direction, resulting in the distance denoted by d1 at the input side being expanded to the distance, denoted by d2, at the output side. It can be appreciated by those skilled in that art that d2 can be readily adjusted by adjusting either one or both of the space expanders 206 and 208.

FIG. 2C shows, according to one embodiment of the present invention, the use of two mirrors 210 and 212 as space expanders. Similar to FIG. 2A, the incoming light beams are redirected by reflection to a new direction.

It should be noted that the individual beam directing component as a space expander may be any material capable of redirecting a light beam, hence referring to as a beam redirecting part. As shown in FIGS. 2A, 2B, and 2C, a reflection prism (202 or 204), a transmission prism (206 or 208), and a mirror (210 or 212) are all applicable for expanding a space between two light beams or expander. Furthermore, any combined pair of these components can work as a space expander.

Figure 3:
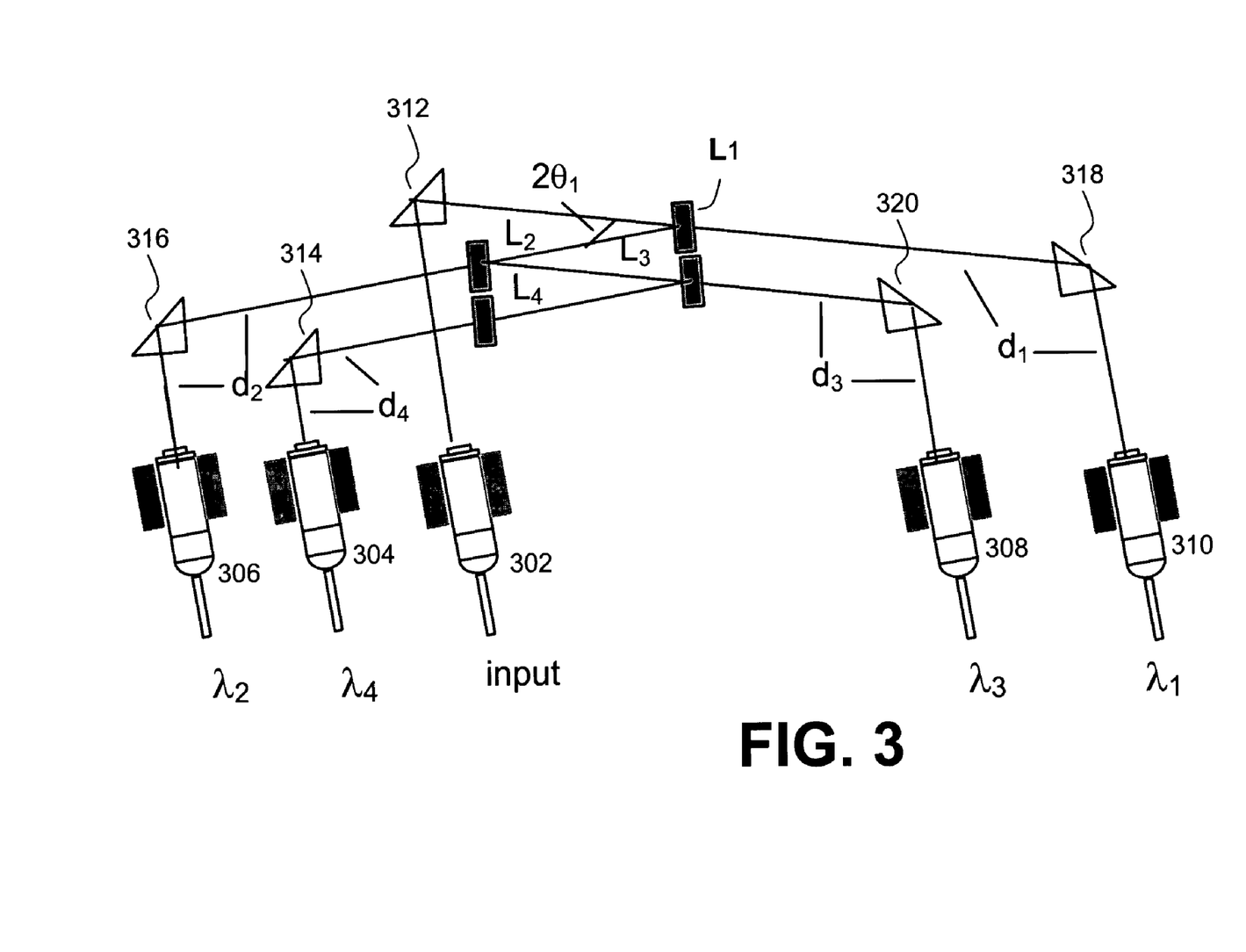
FIG. 3 shows an optical device using space expanders according to one embodiment of the present invention.

FIG. 3 shows an optical device 300 using space expanders according to one embodiment of the present invention. For illustration purpose, the optical device 300 is for processing four different signal channels or wavelengths. Hereinafter, a signal channel and a wavelength are used interchangeably. Unlike the configuration as shown in FIG. 1, once the collimators 302, 304, 306, 308 and 310 are positioned, any adjustments to the filters L1, L2, L3 and L4 can still be performed in conjunction with a set of beam redirecting parts 312, 314, 316, 318 and 320. Further, the distance between two collimators or a filter and a collimator may be expanded by a beam redirecting part as well, therefore, controlling a loss profile of any of the optical parts in the device 300.

In operation, an incoming light beam includes, for example, a number of separate signals, each at a particular wavelength (or channel), for example, wavelengths $\lambda_1, \lambda_2, \lambda_3, \lambda_4$. The light beam is coupled in by a collimator 302 to a first filter L1 via the beam redirecting part 312. The filter L1 is configured to reflect all channels or wavelengths except for the wavelength $\lambda_1$. The transmitted light beam (including wavelength $\lambda_1$) is again redirected by the beam redirecting part 318 to the collimator 310 that outputs the signal $\lambda_1$.

At the same time, the reflected light including wavelengths $\lambda_2, \lambda_3$, and $\lambda_4$ from the filter L1 impinges upon the filter L2. Similar to the filter L1, the filter L2 is configured to reflect all channels or wavelengths except for the wavelength $\lambda_2$. As a result, the transmitted light beam (including wavelength $\lambda_2$) from the filter L2 is again redirected by the beam redirecting part 318 to the collimator 306 that outputs the signal $\lambda_2$.

In a similar fashion, the reflected light including wavelengths $\lambda_3$ and $\lambda_4$ from the filter L2 impinges upon the filter L3. The filter L3 is configured to reflect all channels or wavelengths except for the wavelength $\lambda_3$. As a result, the transmitted light beam (including wavelength $\lambda_3$) from the filter L3 is again redirected by the beam redirecting part 320 to the collimator 308 that outputs the signal $\lambda_3$.

Lastly, the reflected light now includes wavelength $\lambda_4$ from the filter L3 and impinges upon the filter L4. The filter L4 is configured to reflect all channels or wavelengths except for the wavelength $\lambda_4$. Since there is no other wavelength in the reflected light, the reflected light goes through the filter and is then redirected by the beam redirecting part 314 to the collimator 304 that outputs the signal $\lambda_4$. By now, all four wavelengths in the incoming signal have been respectively separated or demultiplexed. It can be appreciated that the same device 300 can be readily used for combining or multiplexing four wavelengths to a multiplexed signal.

One of the key features in the device 300 is the expanded spaces between the collimators as well as one of the collimators and a corresponding filter. As shown in FIG. 3, the expanded spaces are achieved by using a plurality of beam redirecting parts in the optical paths. Each of the beam redirecting parts may be any one of those shown in FIGS. 2A, 2B and 2C. As the result of the use of these beam redirecting parts, it can be observed that the collimators and their corresponding mounting means (e.g., wedges) are turned to another orientation relative to the original orientation in the optical layout shown in the prior art devices. More importantly, the distance between two adjacent collimators can be freely adjusted by moving the individual beam redirecting parts, thus enough mounting space. Further, by adjusting the individual beam redirecting parts, smaller AOI can be achieved.

The present invention may be also described in another way or in more general terms. It is assumed that the channels or wavelengths are numbered according to the beam propagation sequence. For example, a k-th channel corresponds to a k-th filter and a k-th receiving collimator. Thus two laterally adjacent filters or collimators mean a (k−1)-th and a (k+1)-th one. The following denotation is assumed: the total channel count as N, the incidence angle (AOI) on the k-th filter as $\theta_k$, the lateral size of the k-th filter as $A_k$, the lateral size of the k-th collimator as $B_k$, the length of the k-th collimator as $C_k$, the upper lateral size of the mounting space as $E_k$, the down lateral size of the mounting space as $F_k$, the optical path length from the k-th filter to k-th collimator as $d_k$, the beam propagation distance from the (k−1)-th filter to the k-th filter as $L_k$, the distance from the input collimator to the first filter as $L_0$, and the distance from an express channel collimator, if there is one, to the last filter as $L_N$. If there is no express channel, then $L_N=0$.

For the prior art device such as the one shown in FIG. A, the minimum center-to-center distance between two laterally adjacent filters/collimators $(B_{k+1}+B_{k+1})/2+E_{k+1}+F_{k-1}$ is bigger than the minimum achievable distance between two laterally adjacent filters $(A_{k-1}+A_{k+1})/2$. As shown in the device 300 of FIG. 3, the distance between two collimators are increased by a space expander. The minimum lateral distance between two filters is reduced to be close to $(A_{k-1}+A_{k+1})/2$, shorter than the prior arts. Therefore, the filter incidence angle (AOI) is smaller, resulting in better spectral response or filter performance To facilitate the better understanding of the present disclosure and without the loss of generality, a typical free-space WDM implementation is assumed based on commercially available components. The size of an optical filter is 1.4 mm×1.4 mm×1.0 mm, thus $A_k$=1.4 mm, the outer diameter of a small beam collimator $B_k$=1.3 mm. Considering the mounting space required in the prior art, the center-to-center distance between two laterally adjacent filters almost approaches 3.0 mm. The device 300 of FIG. 3, however, has a minimum center-to-center distance being about 1.4 mm. The free-space beam propagation distance from one filter to the next $L_k$ influences the stability of device over temperature range and in different environments, thus cannot be large. $L_k$=6 mm is a good trade-off value. Hence the filter AOI of the prior art is up to 14°. By virtue of the present invention, the gap between two lateral adjacent filters is close to zero. The filter incidence angle can be reduced to 7°, nearly a half of that in the prior art.

Figure 4A:
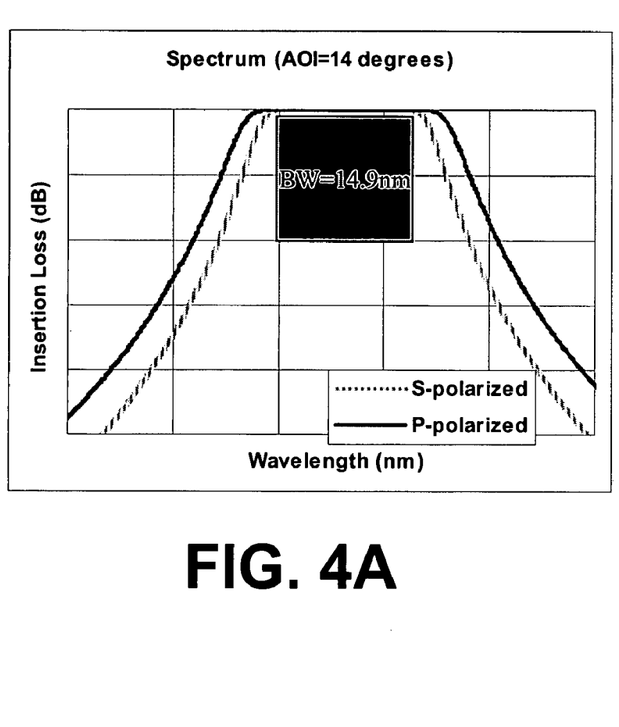
FIG. 4A and FIG. 4B show respective optical spectrums of a CWDM filter at AOI=14 degrees and AOI=7 degrees.
Figure 4B:
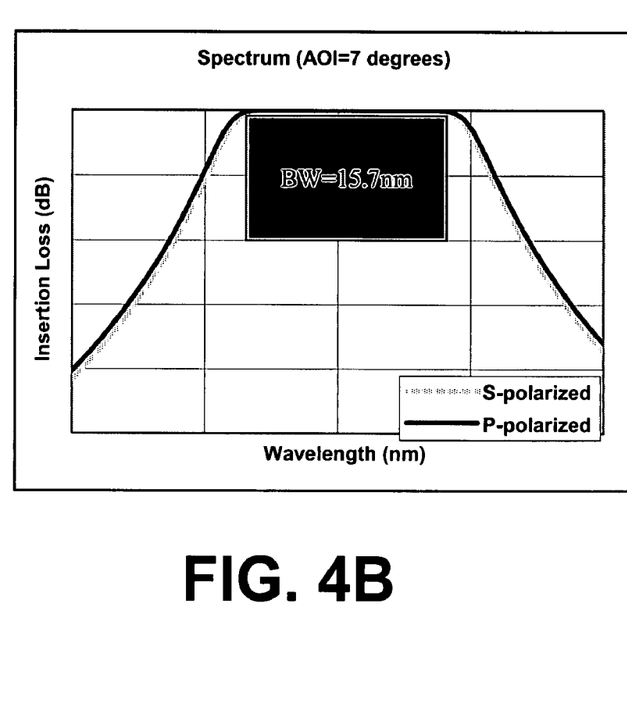

FIG. 4A and FIG. 4B show two respective optical spectrums of a CWDM filter at AOI=14 degrees and AOI=7 degrees. At AOI=14 degrees, the S-polarized spectrum and P-polarized spectrum are significantly spited. According to the filter theory, P-polarized spectrum is independent of the beam incidence angle while S-polarized spectrum shrinks with the increase of the AOI. In practice, the laser source can be of any polarization state. Thus the effective bandwidth is generally dependent on the worst case, i.e., the S-polarized spectrum bandwidth. For AOI=14 degrees, the bandwidth is 14.9 nm. Out of this wavelength bandwidth, the polarization dependent loss (PDL) dramatically increases. Compared with AOI=0 degree, almost 1 nm bandwidth shrinkage can be observed seen. For AOI=7 degrees, however, this shrinkage is as small as 0.2 nm.

Figure 5:
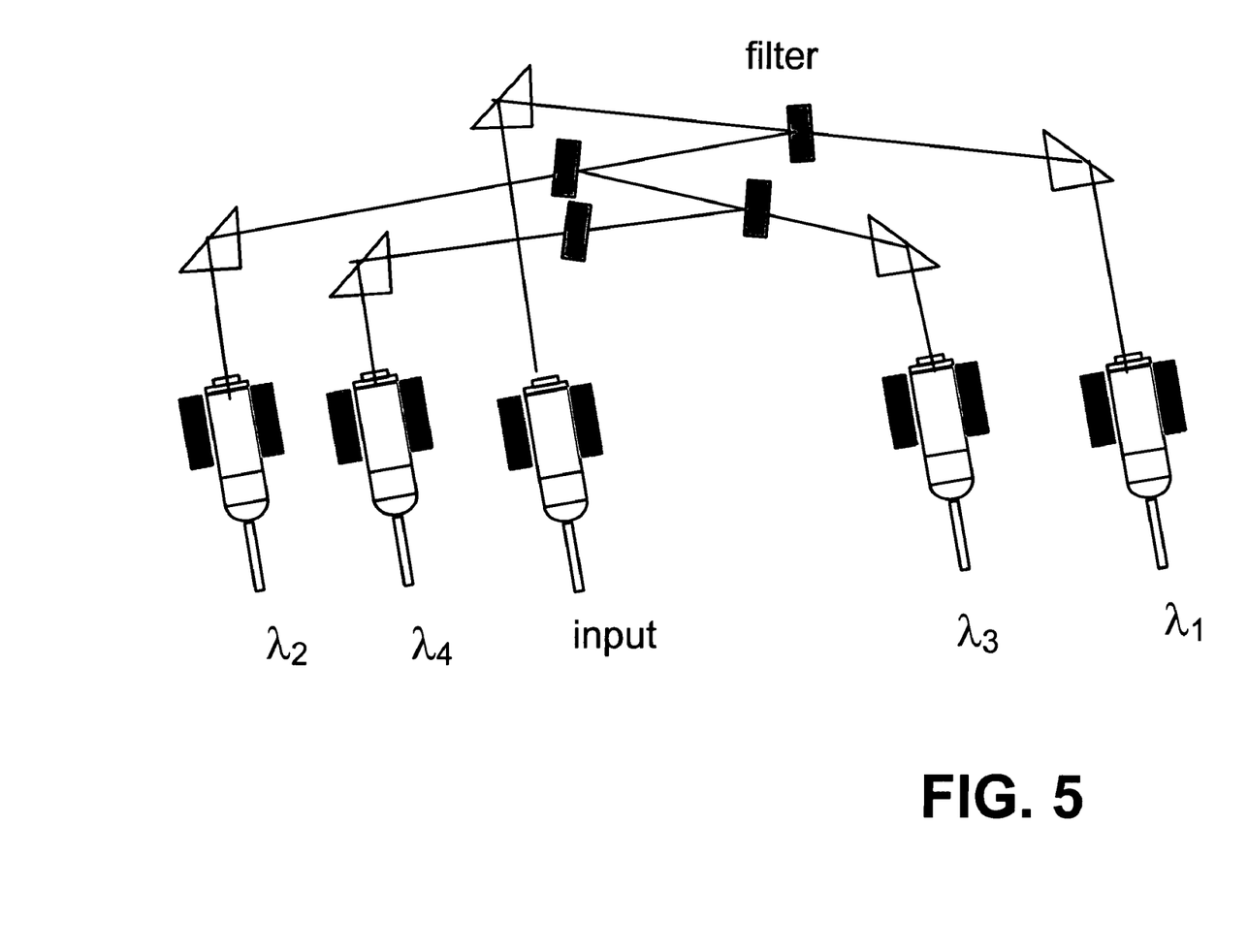
FIG. 5 and FIG. 6 show, respectively, two designs that use the space expanders to compensate for rotations or displacement of the optical filters.
Figure 6:
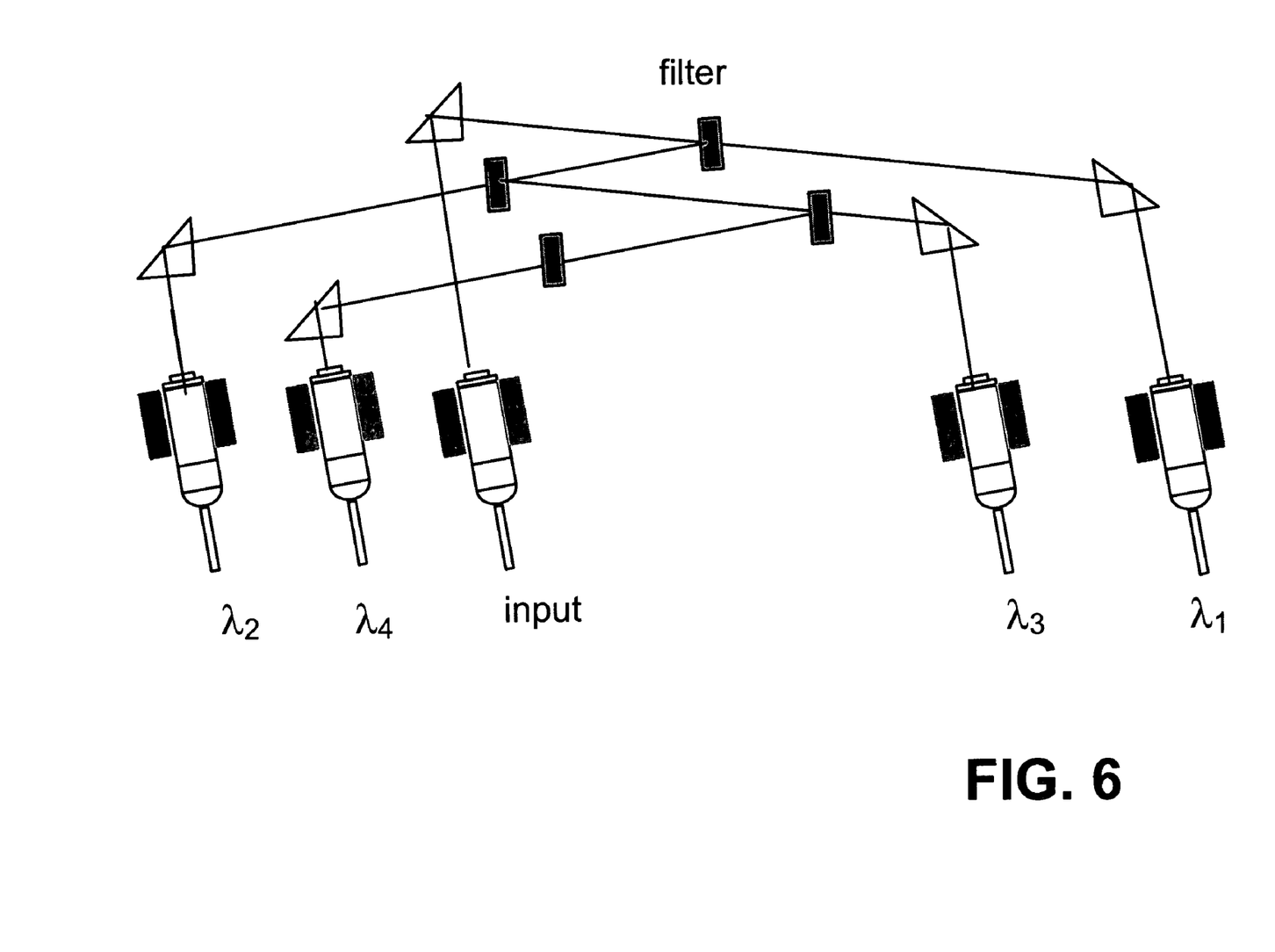

Another important feature in the present invention is that the stringent requirement of the central wavelength of the filter is much relaxed. If a filter central wavelength is out of a desired range, usually the filter will be rotated to increase or reduce the filter incidence angle to tune to the central wavelength. By adjusting the space expanders, the beam deflections and beam displacements can be compensated before the beams reach the collimators. FIG. 5 and FIG. 6 show, respectively, two designs that use the space expanders to compensate for the rotations or displacement of the optical filters.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for providing an optical device, the method comprising:
    inserting a first beam redirecting part in a first part of an optical path between a first optical part and a second optical part, and a second beam redirecting part in a second part of the optical path, each of the first and second beam redirecting parts causing a light beam to make a single turn such that a distance for the light beam from the first optical part to the second optical part is increased,
    wherein the first and second optical parts are not deposed along a direct optical path and all on one side of the optical device, and
    wherein either one of the first and second beam redirecting parts is adjustable to minimize an angle of incidence (AOI) of the light beam to the second optical part.

2. The method of claim 1, wherein each of the first and second beam redirecting parts is a prism or a mirror.

3. The method of claim 1, wherein either one of the first and second beam redirecting parts redirects the light beam by reflection or refraction.

4. The method of claim 3, wherein the light beam is coupled in from the first optical part being a collimator, and the second optical part is an optical filter with a spectral response sensitive to an angle of incidence thereto.

5. The method of claim 4, wherein the light beam hits the first beam redirecting part first before impinging upon the second optical part, and further comprising adjusting the first beam redirecting part such that the spectral response of the optical filter achieves what is desired and without affecting an original position of the collimator.

6. A method for providing an optical device, the method comprising:
    receiving from an input collimator a light beam carrying signals of respective wavelengths;
    positioning an optical filter configured to transmit a signal of one of the wavelengths and reflect all others, the optical filter not positioned in a direct optical path from the input collimator, wherein the light beam from the input collimator does not impinge upon optical filter;
    redirecting the light beam from the input collimator by a first beam redirecting part that causes the light beam to make a single turn to the optical filter, wherein the first beam redirecting part is readily adjusted to minimize an angle of incidence (AOI) of the light beam to the optical filter.

7. The method of claim 6, further comprising:
    redirecting a reflected light beam from the optical filter by a second beam redirecting part to another collimator, the optical filter not positioned in an optical path from the optical filter to the another collimator, wherein the second beam redirecting part is readily adjusted to redirect the transmitted signal from the optical filter to the another collimator.

8. The method of claim 7, wherein each of the first and second beam redirecting parts is a prism or a mirror.

9. The method of claim 7, wherein either one of the first and second beam redirecting parts redirects the light beam by reflection or refraction.

10. The method of claim 7, wherein the input collimator and the another collimator are bonded to a substrate and positioned on one side of the substrate.

11. The method of claim 10, wherein the first and second beam redirecting parts form a space expander such that a distance between two collimators when bonded to the substrate is expanded.

12. An optical device comprising:
    an input collimator receiving a light beam carrying signals of respective wavelengths;
    an optical filter configured to transmit a signal of one of the wavelengths and reflect all others, the optical filter not positioned in a direct optical path from the input collimator, wherein the light beam from the input collimator does not impinge upon optical filter; and
    a first beam redirecting part positioned between the input collimator and the optical filter, the first beam redirecting part causing the light beam to turn to impinge upon optical filter, wherein the first beam redirecting part is readily adjusted to minimize an angle of incidence (AOI) of the light beam to the optical filter such that a desired spectral response of the optical filter is achieved.

13. The optical device of claim 12, further comprising:
    another collimator; and
    a second beam redirecting part positioned between the optical filter and the another collimator, wherein the second beam redirecting part is readily adjusted to redirect the transmitted signal from the another optical filter to the another collimator.

14. The optical device of claim 13, wherein the input collimator and the another collimator are bonded to a substrate and positioned on one side of the substrate to facilitate packaging of the optical device, as a result, the input collimator and the another collimator are one side of the optical device.

15. The optical device of claim 14, wherein the first and second beam redirecting parts form a space expander such that a distance between two collimators when bonded to the substrate is expanded.

16. The optical device of claim 12, wherein each of the first and second beam redirecting parts is a prism or a mirror.

17. The optical device of claim 12, wherein either one of the first and second beam redirecting parts redirects the light beam by reflection or refraction.

* * * * *